United States Patent [19]

Nakayama

[11] Patent Number: 5,086,241
[45] Date of Patent: Feb. 4, 1992

[54] COSTAS LOOP CARRIER WAVE REPRODUCING CIRCUIT

[75] Inventor: Isao Nakayama, Tokyo, Japan

[73] Assignee: NEC Corporation, Tokyo, Japan

[21] Appl. No.: 727,944

[22] Filed: Jul. 10, 1991

[30] Foreign Application Priority Data

Jul. 19, 1990 [JP] Japan .................. 2-191742

[51] Int. Cl.$^5$ .............................................. H03K 5/22
[52] U.S. Cl. ..................... 307/494; 307/529; 328/155; 328/158; 328/160
[58] Field of Search ............... 307/262, 264, 268, 494, 307/529; 328/155, 158, 160

[56] References Cited

U.S. PATENT DOCUMENTS

| | | | |
|---|---|---|---|
| 4,353,000 | 10/1982 | Noda | 307/490 |
| 4,572,975 | 2/1986 | Bowers | 328/160 |
| 4,586,155 | 4/1986 | Gilbert | 307/498 |
| 4,694,204 | 9/1987 | Nishijima et al. | 307/494 |
| 4,870,303 | 9/1989 | McGinn | 328/160 |

*Primary Examiner*—Stanley D. Miller
*Assistant Examiner*—Terry D. Cunningham
*Attorney, Agent, or Firm*—Whitham & Marhoefer

[57] ABSTRACT

A Costas loop carrier wave reproducing circuit includes a first differential amplifier circuit, a second differential amplifier circuit, a multiplying circuit, a first square circuit, a second circuit, and a double-balanced differential amplifier circuit. The first differential amplifier circuit obtains an inphase output from an inphase demodulated signal obtained by performing synchronous detection of a component inphase with a four-phase modulated wave. The second differential amplifier circuit obtains an orthogonal output from an orthogonal demodulated signal obtained by performing synchronous detection of an orthogonal component of the four-phase modulated wave. The multiplying circuit multiplies outputs from the first and second differential amplifier circuits. The first square circuit obtains a square output of an output from the first differential amplifier circuit. The second square circuit obtains a square output of an output from the second differential amplifier circuit. The double-balanced differential amplifier circuit obtains an output difference between the first and second square circuits and outputting a product of the output difference and an output from the multiplying circuit as a PLL control signal.

6 Claims, 3 Drawing Sheets

COSTAS LOOP CARRIER WAVE REPRODUCING CIRCUIT

BACKGROUND OF THE INVENTION

The present invention relates to a demodulator for a four-phase modulated wave and, more particularly, to a Costas loop carrier wave reproducing circuit.

In general, a digital phase modulation scheme for carrier waves, called "PSK", is superior in its frequency band characteristics and code error rate characteristics to other modulation schemes such as amplitude modulation, frequency modulation, and pulse modulation, and hence is widely used in, e.g., PCM microwave communications, satellite communications, and data transmission modems.

This phase modulation scheme includes two-, four-, and eight-phase PSK schemes which can transmit 1-, 2-, and 3-bit data per one sampling period, respectively. The four-phase PSK scheme is most widely used in practice because a PSK scheme for more than four phases demands strict identification characteristics and the arrangement of the modulator becomes complicated.

In this four-phase PSK scheme, the digital code of a signal to be transmitted is divided for every two bits, and a carrier wave is modulated by a phase shift amount corresponding to one of the four combinations of 2-bit data. In many four-phase schemes currently used in practice, phase shift amounts of 0, $\pi/2$, $\pi$, and $2/3\pi$ respectively correspond to the four combinations (0, 0), (0, 1), (1, 0), and (1, 1). According to this scheme, a 2-bit signal component is contained in an inphase component and an orthogonal component of a carrier wave. For this reason, in demodulation, the inphase and orthogonal components of the carrier wave are respectively detected to identify their polarities.

In this case, a synchronous detection scheme is often used as a detection scheme because it has good code error rate characteristics. Unlike other delay detection schemes, however, in the synchronous detection scheme, a carrier wave reproducing circuit must be prepared on the reception side to generate a carrier wave having a correct phase.

This carrier wave reproducing circuit is designed to control a phase-locked loop circuit (PLL) by using a signal obtained by removing a code component from an input carrier wave.

FIG. 3 is a block diagram showing the principle of a four-phase demodulating circuit. Referring to FIG. 3, reference numerals 1, 2, and 7 denote multipliers; 3, 4, and 8, LPFs (low-pass filters); 5, an adder; 6, a subtracter; 9, a VCXO; 10, a phase shifter; and 20, Costas loop carrier wave reproducing circuit.

A signal S as a four-phase modulated wave is represented by the following equation, provided that E is a magnitude, wt is the frequency of a carrier wave, and $\theta$ is a phase shift of 0, 90°, 180°, or 270°:

$$S = E\cos(wt + \theta) \quad (1)$$

If two outputs (one of them is delayed by $2/\pi$) from the VCXO (voltage-controlled crystal oscillator) 9 are respectively represented by A and B, the following equations can be established:

$$A = E_1 \sin(wt + \theta_1) \quad (2)$$

$$B = E_1 \cos(wt + \theta_1) \quad (3)$$

When the four-phase modulated wave S and the oscillator outputs A and B are demodulated by the multipliers 1 and 2 and are filtered by the LPFs (low-pass filters) 3 and 4, the multiplication of equations (1) and (2) is rewritten as follows:

$$E\cos(wt + \theta) \times E_1\sin(wt + \theta_1) =$$

$$\frac{E \cdot E_1}{2} \{\sin(2wt + \theta + \theta_1) - \sin(\theta_1 - \theta)\}$$

If this equation is filtered by an LPF, the following expression is obtained:

$$\approx \frac{E \cdot E_1}{2} \sin(\theta - \theta_1) \quad (4)$$

Similarly, the multiplication of equations (1) and (3) is represented by $$E\cos(wt + \theta) \times E_1\cos(wt + \theta_1) = \quad (5)$$

$$\frac{E \cdot E_1}{2} \{\cos(2wt + \theta + \theta_1) + \cos(\theta - \theta_1)\} \approx$$

$$\frac{E \cdot E_1}{2} \cos(\theta - \theta_1)$$

The outputs from the LPFs are then processed by the Costas loop carrier wave reproducing circuit 20. The circuit 20 serves to keep the phase of an output from the VCXO constant regardless of the phase state (0, 90°, 180°, 270°) of an input four-phase modulated wave.

If the demodulated signals of equations (4) and (5) are respectively represented by P and Q, P+Q is output from an output E point of the adder 5; P−Q, from an output F point of the subtracter 6; and P×Q×(P+Q)×(P−Q), from an output G point of the multiplier 7. At the output E, the following equations are established:

$$P \times Q = \frac{E \cdot E_1}{2} \sin(\theta - \theta_1) \times \frac{E \cdot E_1}{2} \cos(\theta - \theta_1) \quad (6)$$

$$= \frac{(E \cdot E_1)^2}{8} \sin(2\theta + 2\theta_1)$$

$$(P + Q) \times (P - Q) = P^2 - Q^2 = \quad (7)$$

$$\left\{ \frac{E \cdot E_1}{2} \sin(\theta - \theta_1) \right\}^2 - \left\{ \frac{E \cdot E_1}{2} \cos(\theta - \theta_1) \right\}^2 =$$

$$-\frac{(E \cdot E_1)^2}{4} \cos(2\theta - 2\theta_1)$$

At the output G point, the following equation can be obtained by the multiplication of equations (6) and (7:

$$(P + Q) \cdot (P - Q) \cdot PQ = \frac{(E \cdot E_1)^2}{8} \sin$$

$$(2\theta + 2\theta_1) \times \left\{ -\frac{(E \cdot E_1)^2}{4} \cos(2\theta - 2\theta_1) \right\} =$$

$$-\frac{(E \cdot E_1)^4}{64} \{\sin(4\theta - 4\theta_1) + \sin\theta\} =$$

-continued $$-\frac{(E \cdot E_1)^4}{64} \sin 4(\theta - \theta_1)$$

In this case, a phase difference $(\theta-\theta_1)$ between the four-phase modulated wave, the output signal from the VCXO is $n\pi/4$, and the output voltage relatively becomes 0 (n=integer), and the PLL is locked in this If, therefore, this output is fed back to the VCXO 9 through the LPF 8, the data of the signals P and Q are demodulated.

FIG. 2 is a circuit diagram showing the detailed arrangement of the conventional Costas loop carrier wave reproducing circuit 20 shown in FIG. 3. This conventional technique is disclosed in U.S.P. No. 4,694,204, Sep. 15, 1987, assigned to NEC Corporation. This circuit comprises a first multiplying circuit constituted by a double differential amplifier circuit consisting of transistors $Q_{23}$ to $Q_{28}$ and a constant current source $I_8$, a second multiplying circuit constituted by a double differential amplifier circuit consisting of transistors $Q_{33}$ to $Q_{36}$ for receiving collector currents from the first multiplying circuit as common emitter currents, a fourth multiplying circuit constituted by a double differential amplifier circuit consisting of transistors $Q_{33}$ to $Q_{36}$ for receiving collector currents from the second multiplying circuit as common emitter currents, load resistors $R_{11}$ and $R_{12}$ for applying a collector current, as an output voltage, from the fourth multiplying circuit to output terminals a and b, three differential amplifiers, constituted by transistors $Q_1$, $Q_2$, $Q_{21}$, $Q_{37}$, and $Q_{38}$, constant current sources $I_1$, $I_7$, and $I_9$, and load resistors $R_{13}$ and $R_{16}$, for generating input voltages of the demodulated signals P and Q and their sum and difference signals, a bias circuit, constituted by DC power sources $V_1$ and $V_2$ and resistors $R_9$ and $R_{10}$, for biasing the three differential amplifiers, and a peripheral circuit constituted by DC power sources $V_3$, $V_4$, and $V_5$.

Assume that the inphase demodulated signal P is input through a coupling capacitor $C_1$. In this case, since the bases of the transistors $Q_1$ and $Q_{37}$ are biased by the bias power source V through, the bias resistor $R_9$, and the bases of the transistors $Q_2$ and $Q_{38}$ are directly biased by the bias power source $V_1$, a signal in phase with the inphase demodulated signal P appears at each of the load resistors $R_{13}$ and $R_{14}$. Similarly, if the orthogonal demodulated signal Q is input through a coupling capacitor $C_2$, signals in phase with and in opposite phase to the demodulated signal Q appear at the load resistors $R_{15}$ and $R_{16}$ of the differential amplifier constituted by the transistors $Q_{21}$ and $Q_{22}$.

In the first multiplying circuit, the inphase demodulated signal P is input to the base of the transistor $Q_{23}$, and the base of the transistor $Q_{24}$ is biased by the DC power source $V_1$, while a constant current $I_0$ from the constant current source $I_8$ flows in the commonly connected emitter. In this state, a current $I_{CO}$ and a current $I_{CO}$ which are in phase with and in opposite phase to the demodulated signal P respectively flow in the collectors of the transistors $Q_{23}$ and $Q_{24}$. In addition, the bases of the transistors $Q_{25}$ and $Q_{28}$ of the double amplifier circuit are biased by the DC power source $V_2$, and the orthogonal demodulated signal Q is input to the bases of the transistors $Q_{26}$ and $Q_{27}$, while the commonly connected emitted is controlled by the currents $I_{CO}$ and $I_{CO}$ which are in phase with and in opposite phase to the demoudlated singla P. Therefore, the sum of the collector currents of the transistors $Q_{26}$ and $Q_{28}$ become currents $I_{D1}$ and $I_{C2}$ corresponding to the product output $(P\times Q)$ of the two demodulated signals and an output in opposite phase thereto.

Subsequently, the product output currents $I_{C1}$ and $I_{C2}$ of the demoudlated signals P and Q respectively become common emitter curents flowing in the double amplifier circiut constituting the second multiplying circuit. In the double differential amplifier circiut of the second multiplying circiut, signals in phase with the demoulated signals P and Q are respectively supplied to the bases of the transistor $sQ_{30}$ and $Q_{31}$ in a differential manner through the load resistors $R_{13}$ and $R_{15}$. In this state, collector output currents $I_{C3}$ and $I_{C4}$ from the second multipolying circiut are proportional to values obtained by multipoying the product output $(\times Q)$ of the two demodulated signals P and Q by the signal $(P-Q)$.

In the same manner as described above, these two collector output currents $I_{C3}$ and $I_{C4}$ become common emitter currents flowing in the double differential amplifier circiut constituting the third multiplying circiut. Since a signal in phase with the demoudlated signal P and a signal in opposite phase to the demodulated signal Q are differentially supplied to the bases of the transistors $Q_{33}$ and $Q_{36}$ of the double differential amplifier circiut of the third multiplying circiut through the load resistors $R_{14}$ and $R_{16}$, collector output currents $I_{C5}$ and $I_{C6}$ from the third multiplying circiut correspond to values obtained by multipoying the outputs from the second multiplying circiut by the signal $\{P-(-Q)\}$, i.e., the sum signal $(P+Q)$.

WEith this operation, a voltage proportional to a voltage obtained by multplying all the four signals, i.e., the demudulated signals P and Q, the sum signal $(P+Q)$, and the difference signal $(P-Q)$, as the multiplication result obtained by the first to third multipolying circiuts, is output across output terminals a and b.

In this conventional Costas loop carrier wave reproducing circiut, the three double diferential mplifier circiuts are vertically stacked on each other to calculate $P\times Q\times(P+Q)\times(P-Q)$. With this arrangement, in order to linearly operate the circiut, 4 $\times$(VEB+amplitude)+a voltage drop due to the load resistors+a voltage required to normally operate the constant current sources is required as a power source voltage. In practice, however, if VBE=0.75 V, an amplitude=0.5 $V_{pp}$, a voltage drop due to the load resistors=1 V, and a voltage applied to the constant current sources=1 V, $V_{CC}>(0.75+0.5)\times4+1+1=7$ V is required. Therefore, the circuit cannot be operated by a power source voltage of 5 V.

SUMMARY OF THE INVENTION

It is an object of the present invention to provide a Costas loop carrier wave reproducing circuit which allows a decrease in power source voltage.

It is another object of the present invention to provide a Costas loop carrier wave reproducing circuit which allows the use of a MOS transistor.

In order to achieve the above objects, according to the present invention, there is provided a Costas loop carrier wave reproducing circuit comprising a first differential amplifier circuit for obtaining an inphase output from an inphase demodulated signal obtained by performing synchronous detection of a component in phase with a four-phase modulated wave, a second differential amplifier circuit for obtaining an orthogonal output from an orthogonal demodulated signal obtained by performing synchronous detection of an orthogonal component of the four-phase modulated wave, a multiplying circuit for multiplying outputs from the first and second differential amplifier circuits, a first square circuit for obtaining a square output of an output from the first differential amplifier circuit, a second square circuit for obtaining a square output of an output from the second differential amplifier circuit, and a double-balanced differential amplifier circuit for obtaining an output difference between the first and second square circuits and outputting a product of the output difference and an output from the multiplying circuit as a PLL control signal.

DESCRIPTION OF THE PREFERRED EMBODIMENT

The present invention will be described below with reference to the accompanying drawings.

Figure 1:
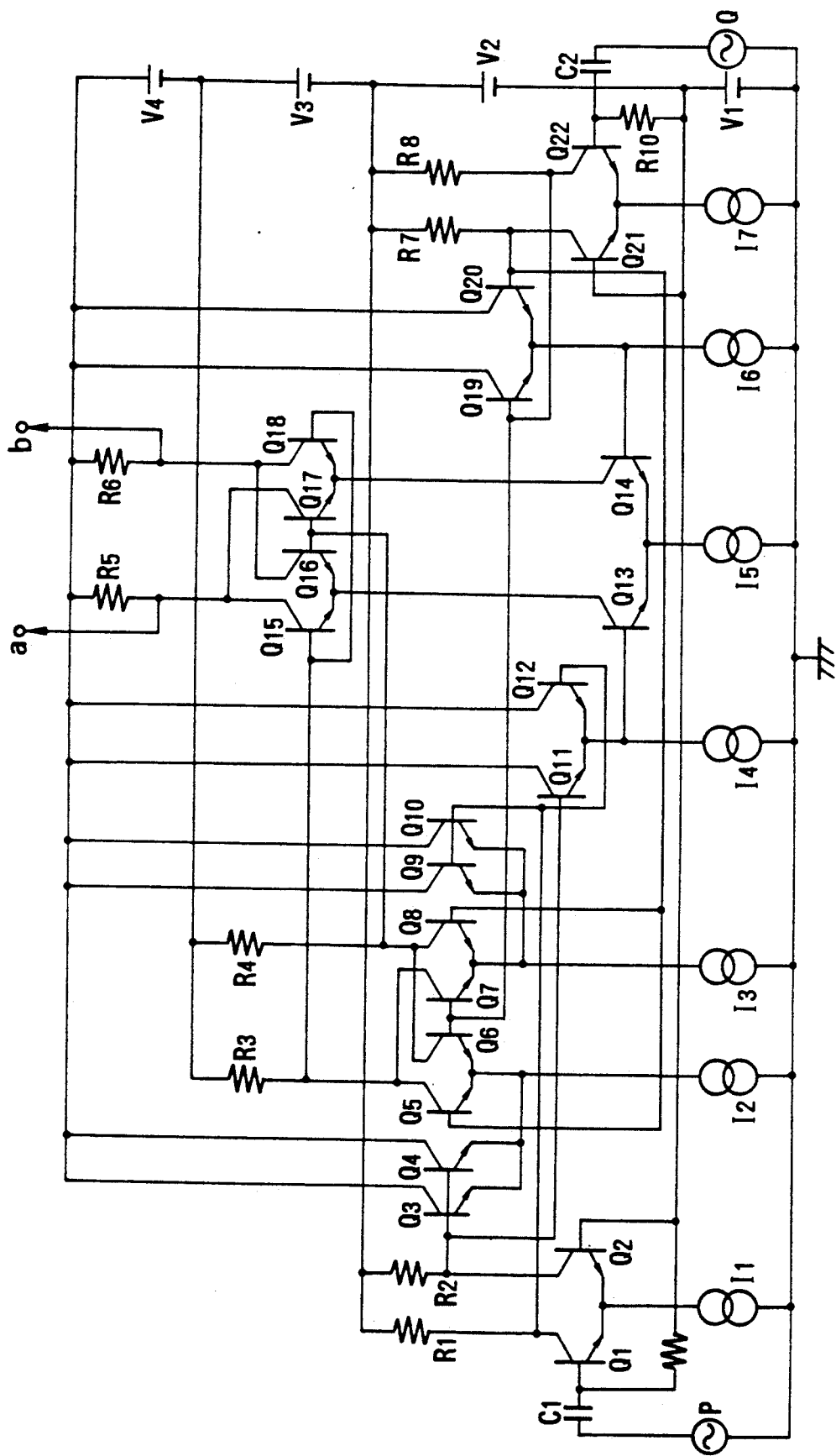
FIG. 1 is a circuit diagram showing a detailed arrangement of a Costas loop carrier wave reproducing circuit according to an embodiment of the present invention.
Figure 2:
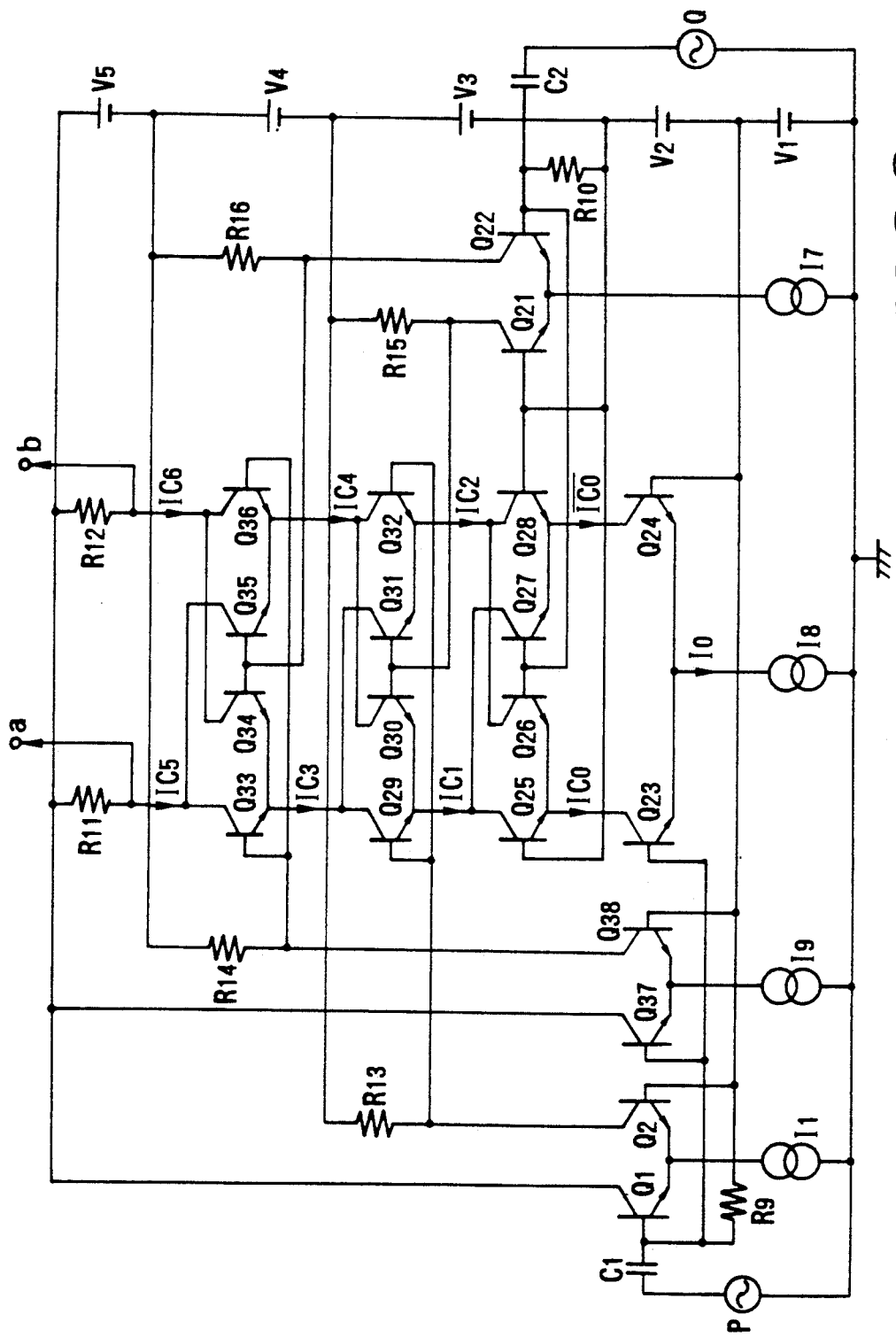
FIG. 2 is a circuit diagram showing a detailed arrangement of a conventional Costas loop carrier wave reproducing circuit.
Figure 3:
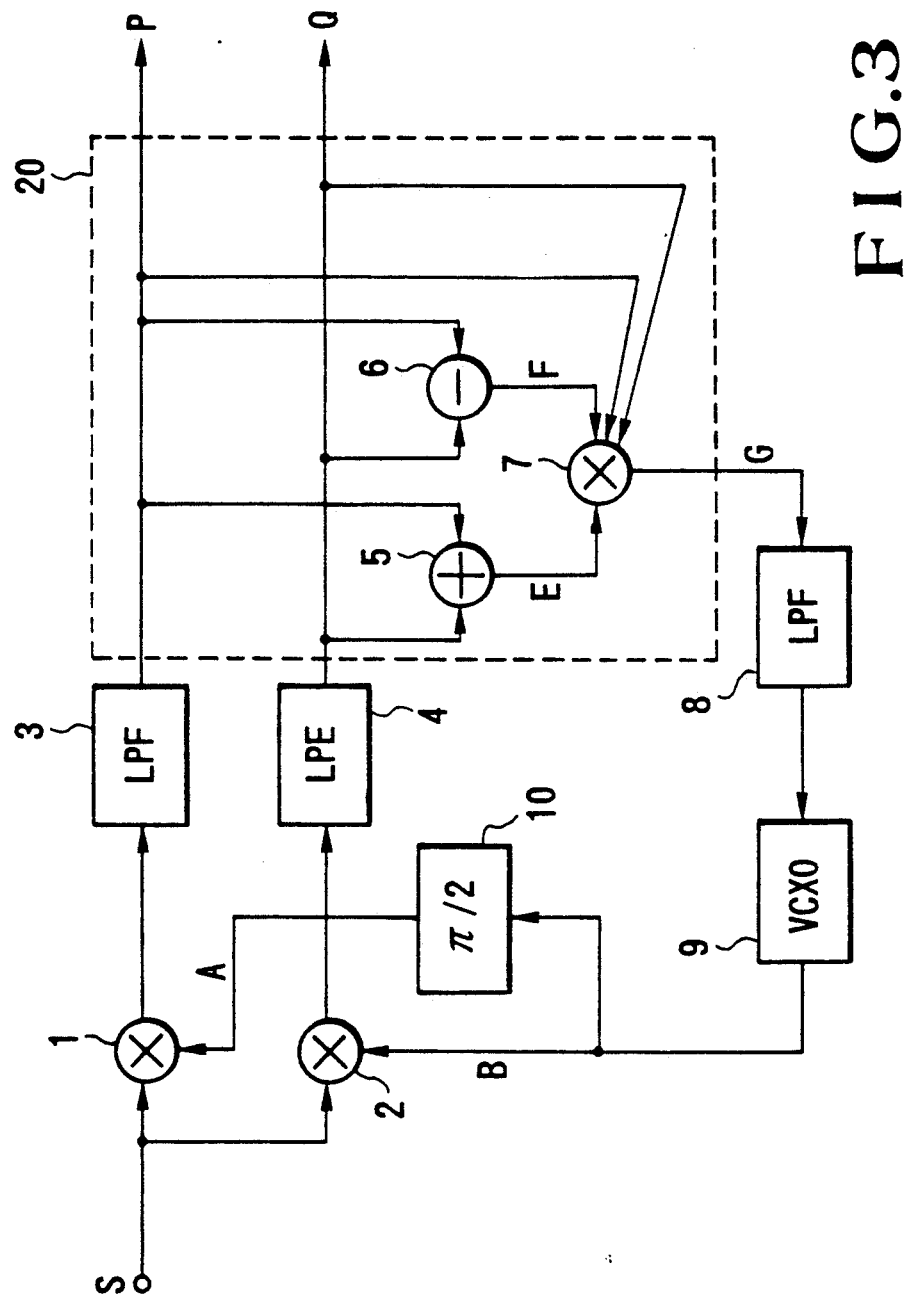
FIG. 3 is a block diagram showing the principle of a four-phase demodulating circuit.

FIG. 1 shows a detailed arrangement of a Costas loop carrier wave reproducing circuit according to an embodiment of the present invention. This circuit comprises: a first differential amplifier circuit constituted by transistors $Q_1$ and $Q_2$, a constant current source $I_1$, and load resistors $R_1$ and $R_2$; a multiplying circuit constituted by transistors $Q_3$ to $Q_{10}$, constant current sources $I_2$ and $I_3$, and load resistors $R_3$ and $R_4$; a first square circuit constituted by transistors $Q_{11}$ and $Q_{12}$, and a constant current source $I_4$; a second square circuit constituted by transistors $Q_{19}$ and $Q_{20}$ and a constant current source $I_6$; a second differential amplifier circuit constituted by transistors $Q_{21}$, and $Q_{22}$, a constant current source $I_7$, and load resistors $R_7$ and $R_8$; and a double-balanced differential amplifier circuit constituted by transistors $Q_{13}$ to $Q_{18}$, a constant current source $I_5$, and load resistors $R_5$ and $R_6$.

Assume that an inphase demodulated signal P is input through a coupling capacitor $C_1$. Since the base of the transistor $Q_1$ is biased by a bias power source $V_1$ through a bias resistor $R_9$ while the base of the transistor $Q_2$ is directly biased by the bias power source $V_1$, signals in phase with and in opposite phase to the demodulated signal P respectively appear at the load resistors $R_1$ and $R_2$.

Similarly, if an orthogonal demodulated signal Q is input through a coupling capacitor $C_2$, signals in phase with and in opposite phase to the demodulated signal Q respectively appear at the load resistors $R_7$ and $R_8$ of the differential amplifier circuit constituted by the transistors $Q_{21}$ and $Q_{22}$. In the multiplying circuit constituted by the transistors $Q_3$ to $Q_{10}$, a signal which is produced across the load resistor $R_2$ and is in phase with the demodulated signal P is input to the common base of the transistors $Q_3$ and $Q_4$, a signal which is produced across the load resistor $R_1$ and is in opposite phase to the demodulated signal P is input to the common base of the transistors $Q_9$ and $Q_{10}$, a signal which is produced across the load resistor $R_7$ and is in phase with the demodulated signal Q is input to the common base of the transistors $Q_5$ and $Q_8$, and a signal which is produced across the load resistor $R_8$ and is in opposite phase to the demodulated signal Q is input to the common base of the transistors $Q_6$ and $Q_7$. In this state, the product of the demodulated signals P and Q appear at the load resistors $R_3$ and $R_4$.

In the first square circuit constituted by the transistors $Q_{11}$ and $Q_{12}$, a signal which is produced across the load resistor $R_2$ connected to a power source $V_2$ lower than a power source $V_4$ and is in phase with the demodulated signal P is level-shifted and input to the base of the transistor $Q_{11}$, and a signal which is produced across the load resistor $R_1$ connected to the power source $V_2$ and is in opposite phase with the demodulated signal P is level-shifted and input to the base of the transistor $Q_{12}$. In this state, the square of the demodulated signal P is obtained as an output from the common emitter of the transistors $Q_{11}$ and $Q_{12}$.

Similarly, in the square circuit constituted by the transistors $Q_{19}$ and $Q_{29}$, a signal which is produced across the load resistor $R_8$ connected to the power source $V_2$ and is in opposite phase to the demodulated signal Q is level-shifted and input to the base of the transistor $Q_{19}$, and a signal which is produced across the load resistor $R_7$ connected to the power source $V_2$ and is in phase with the demodulated signal Q is level-shifted and input to the base of the transistor $Q_{20}$. In this state, the square of the demodulated signal Q is obtained as an output from the common emitter of the transistors $Q_{19}$ and $Q_{20}$.

In the double-balanced differential amplifier circuit constituted by the transistors $Q_{13}$ to $Q_{18}$, an output signal corresponding to the square of the demodulated signal P is input to the base of the transistor $Q_{13}$, and an output signal corresponding to the square of the demodulated signal Q is input to the base of the transistor $Q_{14}$. As a result, a current corresponding to the difference between a demodulated signal $P^2$ and a demodulated signal $Q^2$ flows in the collectors of the transistors $Q_{13}$ and $Q_{14}$. Meanwhile, the output signal obtained as the product of the demodulated signals P and Q is level-shifted and input to the bases of the transistors $Q_{15}$ and $Q_{18}$ constituting the double-balanced differential amplifier circuit through a load resistor $R_3$ connected to a power source $V_3$ lower than the power source $V_4$. Similarly, the output signal level-shifted through a load resistor $R_4$ connected to the power source $V_3$ is input to the bases of the transistor $Q_{16}$ and $Q_{17}$. As a result, in the double-balanced differential amplifier circuit, the result obtained by performing a multiplication of the demodulated signals P and Q according to $P \times Q \times (P^2 - Q^2)$ is output to the load resistors $R_5$ and $R_6$.

The square circuit constituted by the transistors $Q_{11}$, $Q_{12}$, $Q_{19}$, and $Q_{20}$ will be described in detail below.

If the common emitter voltage of the transistors $Q_{11}$ and $Q_{12}$ is represented by $V_E$; the collector currents of the transistors $Q_{11}$ and $Q_{12}$, $I_{C1}$ and $I_{C2}$; the thermal voltage of the transistors $Q_{11}$ and $Q_{12}$, $v_t$; a reverse saturation current, $I_S$; and the base bias voltage of the transistors $Q_{11}$ and $Q_{12}$, $V_A$, the following equations can be obtained:

$$V_A + P - V_E = V_T \ln \frac{I_{c1}}{I_s} \quad (1)$$

$$V_A - P - V_E = V_T \ln \frac{I_{c2}}{I_s} \quad (2)$$

If equations (1) and (2) are added together, the following equation is established:

$$2V_A - 2V_E = V_T \ln \frac{I_{c1} I_{c2}}{I_s^2} \quad (3)$$

If the mutual conductance of the differential circuit is represented by gm, and the current supplied from the constant current source $I_4$ is represented by $2I_O$ ($I_O >> P \times gm$), the following formulae are obtained:

$$I_{C1} \approx I_o + 2 \times O \times gm$$

$$I_{C2} \approx I_o - 2 \times P \times gm$$

Therefore, equation (3) is rewritten as follows:

$$2V_A - 2V_E = V_T \ln \left\{ \frac{(I_o + 2P \times gm)(I_o - 2P \times gm)}{I_s^2} \right\}$$

$$= V_T \ln \left\{ \frac{I_o^2}{I_s^2} \left( 1 - \frac{4P^2 gm^2}{I_o^2} \right) \right\}$$

Since $I_O >> P \times gm$, $$2V_A - 2V_E \approx 2V_T \ln \frac{I_o}{I_s} - V_T \frac{4 \times P^2 \times gm^2}{I_o^2}$$

If gm is expressed by $V_T$ and $I_O$, $$gm = \frac{2I_o}{4V_T} = \frac{I_o}{2V_T}$$

Therefore, $V_E$ is given by $$V_E = \frac{P^2}{2V_T} + V_B - V_T \ln \frac{I_o}{I_s}$$

With this operation, an output proportional to the square of the input signal P can be obtained.

As has been described above, according to the present invention, a practical power source voltage can be noticeably decreased as compared with the conventional circuit.

Assume that the base-emitter voltage of a transistor is 0.75 V, the amplitude is 0.5 $V_{pp}$, the voltage drop due to the load resistance of an output is 1 V, and the voltage applied to a constant current source is 1 V. In this case, the power source voltage is $V_{BE} + 0.5 \text{ V} \times 2 + 1 \text{ V} + 1 \text{ V} + 3.75$ V. Therefore, even if the power source voltage is set to be 5 V, the circuit can be easily operated. That is, even a MOS transistor can be used.

What is claimed is:

1. A Costas loop carrier wave reproducing circuit comprising:

a first differential amplifier circuit for providing an inphase output signal in response to an inphase demudulated signal;

a second differential amplifier circiut for providing an orthogonal output signal in response to an orthogonal demodulated signal;

a multifplying the circiut for multiplying output signals from said first and second differential amplifier circiuts and providing the result as an output signal;

a first square circiut for providing a signal being the square of the output signal said first differenntial amplifier circiut;

a second square circiut for providing a signal being the square of the output signal from said second differential amplifier circuit; and a double-balanced differential amplifier circuit connected to said first and second square circiuts and said multiplying circiut for obtaining difference between the output signals from said first and second square circiuts and outputting a product of the difference and the output signal from said multiplying circiut as a OLL control signal.

2. A circuit according to claim 1, further comprising a low-pass filter for extracting a low-frequency component of the output signal from said double-balanced differential amplifier circuit, and a voltage-controlled oscillator whose output frequency is controlled by an output voltage from said low-pass filter to generate inphase and orthogonal reference phase carrier waves for synchronous detection.

3. A circuit according to claim 1, wherein said multiplying circuit comprises a first transistor for receiving a first input as a base input, a second transistor for receiving a second input in opposite phase to the first input as a base input, a third transistor for receiving a third input as a base input, a fourth transistor, connected to said third transistor to constitute a double differential circuit, for receiving a fourth input in opposite phase to the third input as a base input, a first constant current source to which emitters of said first and third transistors are commonly connected, a second constant current source to which emitters of said second and fourth transistors are commonly connected, and load resistors to which collectors of said third and fourth transistors constituting said double differential circuit are commonly connected.

4. A circuit according to claim 3, wherein said first and second transistors are respectively constituted by transistor pairs having collectors, 4 bases, and emitters, all of which are commonly connected, and said third and fourth transistors are respectively constituted by transistor pairs having bases and emitters, all of which are commonly connected.

5. A circuit according to claim 1, wherein a load resistor of said multiplying circuit is connected to a power source having a voltage lower than a power source voltage to supply a level-shifted output to said double-balanced amplifier circuit.

6. A circuit according to claim 1, wherein said first and second differential amplifier circuits have load resistors connected to a power source having a voltage lower than a power source voltage to supply level-shifted outputs to said multiplying circuit.

* * * * *